(12) United States Patent
Bryant et al.

(10) Patent No.: US 8,291,382 B2
(45) Date of Patent: Oct. 16, 2012

(54) MAINTENANCE ASSESSMENT MANAGEMENT

(75) Inventors: Barbara J. Bryant, Clinton Corners, NY (US); Nicole M. Fagen, Pleasant Valley, NY (US); William E. Spencer, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 1120 days.

(21) Appl. No.: 12/177,187

(22) Filed: Jul. 22, 2008

(65) Prior Publication Data

US 2010/0023933 A1 Jan. 28, 2010

(51) Int. Cl.
G06F 9/44 (2006.01)
G06F 9/445 (2006.01)

(52) U.S. Cl. ......... 717/124; 717/131; 717/168; 717/174
(58) Field of Classification Search .................. None
See application file for complete search history.

(56) References Cited

U.S. PATENT DOCUMENTS

| | | | |
|---|---|---|---|
| 6,389,370 B1 | 5/2002 | Delaney et al. | |
| 6,526,574 B1 * | 2/2003 | Jones | 717/168 |
| 6,763,517 B2 * | 7/2004 | Hines | 717/124 |
| 6,931,637 B2 * | 8/2005 | Lee et al. | 717/168 |
| 6,944,856 B2 * | 9/2005 | Taylor | 717/171 |
| 6,954,928 B2 * | 10/2005 | Allsop et al. | 717/168 |
| 6,976,251 B2 | 12/2005 | Meyerson | |
| 7,065,413 B2 * | 6/2006 | Moebius et al. | 700/19 |
| 7,251,812 B1 | 7/2007 | Jhanwar et al. | |
| 7,516,367 B1 * | 4/2009 | Beltowski et al. | 714/38.1 |
| 7,624,052 B1 * | 11/2009 | Seaman et al. | 705/35 |
| 7,735,078 B1 * | 6/2010 | Vaidya | 717/171 |
| 7,765,538 B2 * | 7/2010 | Zweifel et al. | 717/168 |
| 7,900,259 B2 * | 3/2011 | Jeschke et al. | 726/25 |
| 8,028,282 B2 * | 9/2011 | Brannock et al. | 717/169 |
| 2002/0184619 A1 | 12/2002 | Meyerson | |
| 2004/0255290 A1 | 12/2004 | Bates et al. | |
| 2006/0265630 A1 | 11/2006 | Alberti et al. | |
| 2007/0277167 A1 | 11/2007 | Smith et al. | |
| 2007/0300215 A1 | 12/2007 | Bardsley | |

* cited by examiner

*Primary Examiner* — Isaac Tecklu
*Assistant Examiner* — Mohammad Kabir
(74) *Attorney, Agent, or Firm* — Cantor Colburn LLP; William A. Kinnaman, Jr.

(57) ABSTRACT

A computer-implemented method, system, and computer program product for assessing environment specific maintenance actions are provided. The method includes identifying a maintenance update for a specific environment including one or more computer systems, where the maintenance update addresses one or more known problems. The method also includes applying factors to determine an assessment index for the one or more known problems as a function of the specific environment. The assessment index indicates a level of installation criticality relative to the specific environment. The method further includes outputting an installation recommendation for the identified maintenance update in response to determining the assessment index.

9 Claims, 3 Drawing Sheets

200

| 224 | 202 | 204 | 206 | 208 | | 210 | |
|---|---|---|---|---|---|---|---|
| Evaluated Action | FMID | SYSMOD NAME | APAR NUMBER | --- RESOLVING SYSMOD --- | | PTF AVAIL | |
| | | | | NAME | STATUS | RECEIVED | |
| ○ INSTALL | HDZ11C0 | HDZ11C0 | AW27894 | UW41039 | GOOD | NO | Date |
| ○ INSTALL & REMOVE | | | | | | | |
| ○ KEEP | | | | | | | |
| ○ REMOVE | | | | | | | |

| 212 | 214 | 216 | 218 | 220 | 222 |
|---|---|---|---|---|---|
| CLASS | SYMPTOMS | COMPID | Users Affected | User Notes | Assessment Index |
| HIPER | FUL, PRV | COMPID | User Affected | Rich Text Field | Recommend/Value |

FIG. 2

MAINTENANCE ASSESSMENT MANAGEMENT

BACKGROUND

The present invention relates generally to managing software deployment, and, in particular, to assessing environment specific maintenance actions for software updates in computer systems.

Modern software applications typically utilize a number of functions, directly and indirectly. The fulfillment of function requests frequently cross multiple operating system components. Software applications may call the functions explicitly via an external call, or, a software application may invoke function A, where function A may subsequently call function B, C, and D. Some software problems (e.g., bugs) may surface in customer environments. The software problems may only surface for a specific set of circumstances (e.g., order of function calls, software level, hardware level or any combination there of) or in highly involved timing situations. Customers desire to keep their system(s) as stable as possible. In order to ensure an enterprise is as resilient as possible to software defects customers must review and apply maintenance (individual fixes to software defects) on a regular basis. Today, the review of software defects is a manual process. It is highly complicated to determine which fixes apply to particular environments, if the environment in which the defect can be encountered exists in the customer's enterprise and which fixes introduce more risk than they stabilize.

SUMMARY

An exemplary embodiment is a computer-implemented method for assessing environment specific maintenance actions. The method includes identifying a maintenance update for a specific environment including one or more computer systems, where the maintenance update addresses one or more known problems. The method also includes applying factors to determine an assessment index for the one or more known problems as a function of the specific environment. The assessment index indicates a level of installation criticality relative to the specific environment. The method further includes outputting an installation recommendation for the identified maintenance update in response to determining the assessment index.

Another exemplary embodiment is a system for maintenance assessment management. The system includes a service inventory identifying a specific environment of the system and a maintenance assessment tool (MAT) executing on a user system. The MAT performs a method that includes identifying a maintenance update for the specific environment, where the maintenance update addresses one or more known problems. The MAT also applies factors to determine an assessment index for the one or more known problems as a function of the specific environment. The assessment index indicates a level of installation criticality relative to the specific environment. The MAT outputs an installation recommendation for the identified maintenance update in response to determining the assessment index.

A further exemplary embodiment is a computer program product for assessing environment specific maintenance actions. The computer program product includes a storage medium readable by a processing circuit and storing instructions for execution by the processing circuit for implementing a method. The method includes identifying a maintenance update for a specific environment including one or more computer systems, where the maintenance update addresses one or more known problems. The method further includes applying factors to determine an assessment index for the one or more known problems as a function of the specific environment. The assessment index indicates a level of installation criticality relative to the specific environment. The method additionally includes outputting an installation recommendation for the identified maintenance update in response to determining the assessment index.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

Referring now to the drawings wherein like elements are numbered alike in the several FIGURES:

FIG. 2 depicts an example of an interactive interface for maintenance assessment in accordance with exemplary embodiments.

DETAILED DESCRIPTION

Exemplary embodiments provide a maintenance assessment tool to assess environment specific maintenance actions. Large and complex computing environments, such as mainframe computer systems, can execute numerous software applications on variety of processing subsystems. As problems are discovered and solutions are created to remedy the problems, enterprise administrators must sift through available maintenance updates to determine which updates are applicable to their specific environment. Since different enterprises can vary dramatically in customized configurations of hardware and software, it may be difficult for software providers to accurately assess the likely impact of installing updates with respect to potential adverse side effects for all enterprises. Introducing unnecessary changes can place an enterprise at risk of a harmful side effect without the benefit of fixing a critically important problem. Conversely, failing to install a critical update can lead to detrimental results. The process of manually analyzing available maintenance updates, assessing needs, and potential impacts can be a time consuming process for enterprises as well as the software providers that assist the enterprises. In an exemplary embodiment, the maintenance assessment tool assesses environment specific maintenance actions for a given enterprise and provides an assessment index indicating the relative value of installing maintenance updates as a function of the specific environment. Additionally, the maintenance assessment tool can track evaluations and maintain notes about the enterprise's decisions regarding each maintenance update, or, automatically take actions for fixes based on a determined assessment index threshold.

Figure 1:
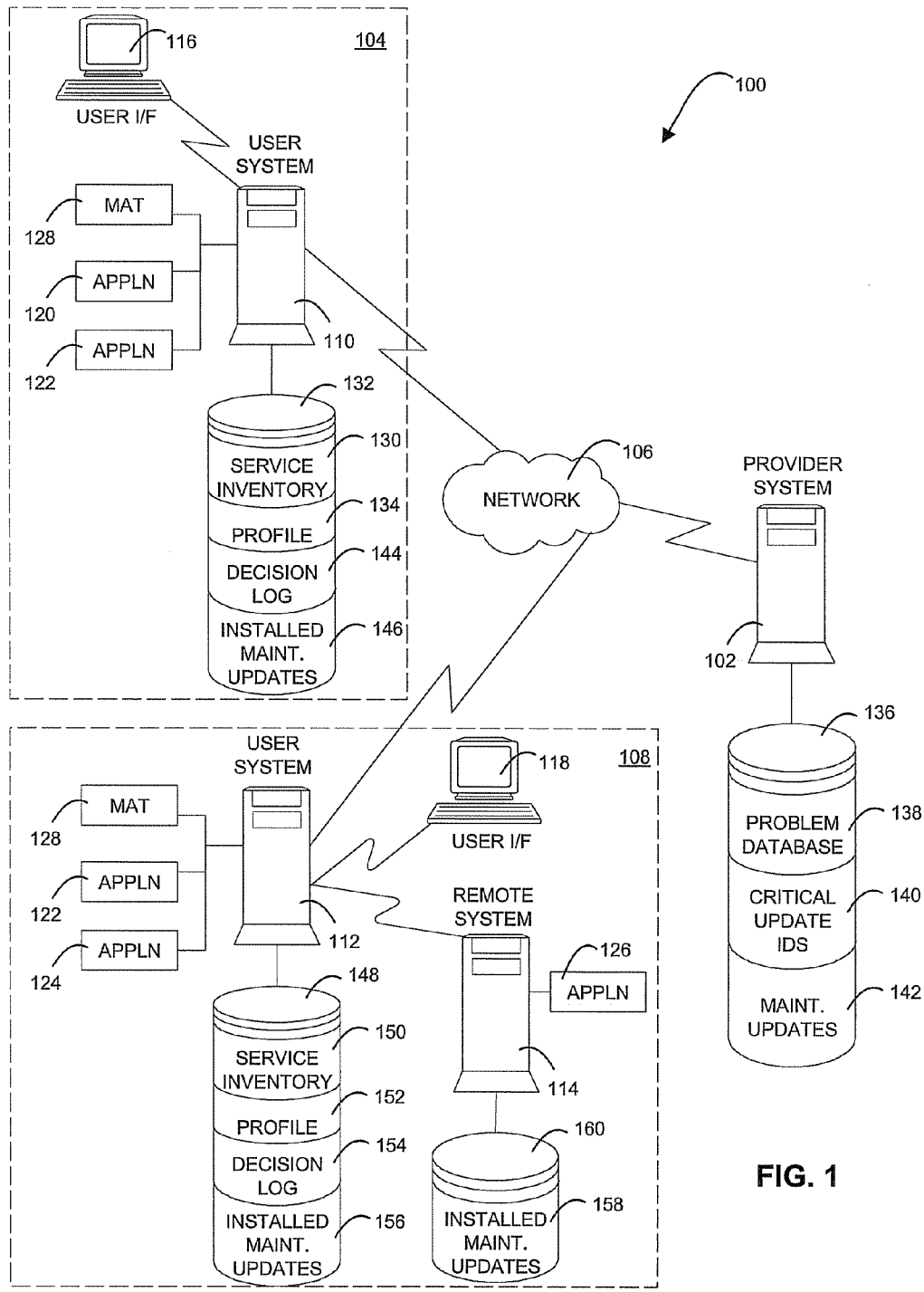
FIG. 1 depicts a system for maintenance assessment management in accordance with exemplary embodiments.

Turning now to the drawings, it will be seen that in FIG. 1 there is a block diagram of a system 100 upon which maintenance assessment management is implemented in exemplary embodiments. The system 100 of FIG. 1 includes a provider system 102 in communication with enterprises 104 and 108 over a network 106. In exemplary embodiments, the provider system 102 is a processing system including at least one processing circuit (e.g., a CPU) capable of reading and executing instructions, and providing connectivity with the enterprises 104 and 108. Although only two enterprises 104 and 108 are depicted in FIG. 1, it will be understood that the provider system 102 can communicate with numerous enterprise systems of varying sizes and configurations. The provider system 102 may perform as a Web server, an application server, and a data management system for distributing software and information about problems via the network 106.

While only a single provider system 102 is shown in FIG. 1, it will be understood that multiple provider systems can be implemented, each in communication with one another via direct coupling or via one or more networks. For example, multiple provider systems may be interconnected through a distributed network architecture. The single provider system 102 may also represent a cluster of provider systems collectively performing processes in conjunction with the enterprises 104 and 108.

The network 106 may be any type of communications network known in the art. For example, the network 106 may be an intranet, extranet, or internetwork, such as the Internet, or a combination thereof. The network 106 can include wireless, wired, and/or fiber optic links.

The enterprises 104 and 108 can include any number of computer systems, such as user system 110 of enterprise 104 and user system 112 of enterprise 108. The enterprise 108 includes additional computer subsystems, for instance, remote system 114 in communication with the user system 112. The user systems 110 and 112 and the remote system 114 can comprise mainframes, desktop, laptop, and/or general-purpose computer devices accessed via user interfaces 116 and 118. The user interfaces 116 and 118 can include various I/O devices, such as keyboard and display devices. The user systems 110 and 112 and the remote system 114 can execute a variety of applications, some of which may be common between the enterprises 104 and 108. For example, user system 110 can execute applications 120 and 122, while the user system 112 executes applications 122 and 124, and the remote system executes application 126. The applications 120-126 can include a variety of complex software applications comprised of multiple components and functions, e.g., a database application, a web server application, a word processing application, a spreadsheet application, a manufacturing control system application, a data warehousing application, an inventory and purchasing application, and the like. In exemplary embodiments, the enterprises 104 and 108 are configured with different hardware and/or software such that each enterprise represents a different environment. For example, even though both user systems 110 and 112 can execute application 122, they may exploit different features of application 122 or rely on different underlying operating systems and/or hardware platforms.

In an exemplary embodiment, the user systems 110 and 112 each employ a maintenance assessment tool (MAT) 128 to assess availability of updates to the applications in each specific environment of the enterprises 104 and 108. The user system 110 accesses a service inventory 130 on a data storage device 132 that is specific to the environment of the enterprise 104. The service inventory 130 can include information about specific versions of the applications 120 and 122, updates installed and implemented, as well as details regarding the hardware and other software installed in the enterprise 104. Data in the service inventory 130 can be manually configured or automatically populated as the user system 110 is updated. Alternatively, a script can be executed that discovers and collects configuration data for the enterprise 104. The data storage device 132 may also include profile data 134. The profile data 134 can include an age parameter to specify how long an update should be aged before accepted for installation, thus increasing the likelihood that the update is stable and any problems with the update have been identified. The profile data 134 may also include other configurable data, such as identified functions or components that are of greater importance or sensitivity. For example, the profile data 134 may identify problem prone components or functions, components or functions needed for growth, and components or functions of interest.

Periodically or upon a user request, the MAT 128 contacts the provider system 102 to determine if updates are available and to assist the user in determining whether particular updates should be installed based on the specific environment as configured for each enterprise 104 and 108. The provider system 102 accesses a data storage device 136 to analyze known problems logged in problem database 138. The problem database 138 includes problem reports, also referred to as authorized problem analysis reports (APARs), that detail software defects, including defect attributes such as problem classification, symptoms, triggers to experience the problem (e.g., application, function, parameter, subsystem, etc.), and various identifiers to track problem reports. The MAT 128 can also access critical update identifiers 140 on the data storage device 136 to determine which problems are deemed critical to system performance and which maintenance updates 142 are for fixing particular problems. For example, a problem in the problem database 138 can be classified as a high-impacting problem (HIPER), with symptoms such as data loss, system outage, performance loss, and function loss across one or more computer systems, while a less severe problem may result in abnormal termination of an application with no additional side effects. The maintenance updates 142 represent program temporary fixes (PTFs) that provide workarounds between major product releases to fix the known problems logged in the problem database 138. In an exemplary embodiment, the problem database 138 contains all fixes, the critical update identifiers 140 contains only high impacting problems, and the maintenance updates 142 are recommended fixes that have been tested.

The MAT 128 of enterprise 104 analyzes the problem database 138 and the critical update identifiers 140 in view of the contents of the service inventory 130 and profile 134 to determine which of the maintenance updates 142 are the most important for the specific environment of the enterprise 104. The MAT 128 determines the level of exposure to problems as identified in trigger data of problem records in the problem database 138 through analyzing the service inventory 130 to determine whether the affected hardware and/or software is presently used in the environment of the enterprise 104. In an exemplary embodiment, the MAT 128 applies factors determine an assessment index for a known problem as identified in the problem database 138 as a function of the specific environment, where the assessment index indicates a level of installation criticality relative to the specific environment of the enterprise 104. The factors include a level of importance as a function of one or more defect attributes associated with the known problem, a level of exposure to the known problem in the specific environment, and policies of the specific environment included in the profile data 134. The level of importance of defect attributes can be a weighted value that ranks symptoms of problems based on severity, from a multiple system failure across the enterprise 104 to failures more localized in scope (system, application, function, component, etc.). Higher weighting is also applied for more frequently used items identified in the service inventory 130, as well as the pervasiveness of the problem, e.g., a common path versus a unique path. The profile data 134 provides additional guidance for weighting applied to the assessment index value, with higher weighting applied to components or functions that are of greater importance or sensitivity. The profile data 134 can also establish higher weighting to areas that are deemed to have greater future importance for the enterprise 104.

The assessment index determined by the MAT 128 acts as a filter for users to more readily determine which of the maintenance updates 142 are the most important for the specific environment of the enterprise 104. Some of the maintenance updates 142 will not be relevant to the enterprise 104 simply because the enterprise 104 does not have a configuration that would ever result in utilization of a particular update, e.g., a fix to drivers used only by application 126. Thus, recommending such a fix under this circumstance would introduce an unnecessary change and associated unnecessary risk; hence, the update will be ignored. On the other hand, when an application is exploiting a function and has the pertinent system configuration, the fix will be recommended. Therefore, the configuration indicates how exposed the enterprise 104 is to a particular critical fix in the maintenance updates 142.

The MAT 128 can determine importance factors for the maintenance updates 142 based on the impact of a problem when/if the problem is encountered. For example, if the problem results in a system outage or a loss of data, it is assigned an assessment index higher than a fix that results in an abnormal ending of an application but has no other adverse impacts.

In calculating the assessment index, the MAT 128 also considers whether the maintenance updates 142 themselves have known problems in the problem database 138. The MAT 128 does not recommend installing maintenance updates 142 with known problems that have not been resolved (e.g., zero assessment index). Penetration of the fix (number of systems with the fix installed) is also a consideration. This may be tracked for the enterprise 104 itself and/or tracked at the provider system 102 based on the number/frequency of downloads of particular maintenance updates 142 across multiple enterprises.

The MAT 128 outputs an installation recommendation for an identified maintenance update in response to determining the assessment index. The recommendation can be in the form of reporting the raw value of the assessment index, a text/graphical recommendation, and/or an audio output. For example, various degrees of critically can result in a flashing red "urgent update needed" message along with an audible beep or tone, while a maintenance update that is deemed low impact can have a basic "update recommended" message. Additionally, the MAT 128 can block reporting of maintenance updates 142 that are deemed useless or fail to meet aging criteria (e.g., the fix has only been available for one week and the enterprise waits for a minimum of one month before accepting a new fix).

A decision log 144 can be provided in which choices made while using the MAT 128 are recorded. The decision log 144 provides a source of audit data to compare actions suggested with actions taken. The decision log 144 may also include note fields to document the user's reasons for installing or ignoring the maintenance updates 142. The selected maintenance updates are stored as installed maintenance updates 146. The installed maintenance updates 146 can be applied to update the applications 120 and/or 122, in addition to other elements of the enterprise 104 that are not depicted.

In a similar fashion, the enterprise 108 is updated using its MAT 128. The user system 112 interfaces to a data storage device 148 with a similar but independent version of the service inventory 150, performing substantially the same functions as the service inventory 130. The data storage device 148 may also include profile data 152, a decision log 154 and installed maintenance updates 156 targeting the specific environment of the enterprise 108 instead of the enterprise 104. The MAT 128 of enterprise 108 can also manage maintenance updates for the remote system 114, e.g., updating application 126. The MAT 128 may write installed maintenance updates 158 for the remote system 114 to data storage device 160 local to the remote system 114.

The data storage devices 132, 136, 148, and 160 refer to any type of computer readable storage medium and may comprise a secondary storage element, e.g., hard disk drive (HDD), tape, or a storage subsystem that is internal or external to the systems 102, 110, 112, and 114 respectively. Types of data that may be stored in the data storage devices 132, 136, 148, and 160 include, for example, various files and databases. It will be understood that the data storage devices 132, 136, 148, and 160 shown in FIG. 1 are provided for purposes of simplification and ease of explanation and is not to be construed as limiting in scope. To the contrary, there may be multiple data storage devices utilized by each system 102, 110, 112, and 114. Additionally, the various files and databases on the data storage devices 132, 136, 148, and 160 can be combined within the scope of the invention.

FIG. 2 depicts an example of an interactive interface 200 for maintenance assessment in accordance with exemplary embodiments. The MAT 128 of enterprise 104 or 108 may produce the interactive interface 200 and support access to the interactive interface 200 via the user interface 116 or 118. In an exemplary embodiment, the interactive interface 200 includes a display list of a product/release identifier (FMID) 202, a modification level of the code (SYSMOD) name 204, an APAR number 206, status associated with the system resolving the SYSMOD 208, PTF availability date 210, classification of problem 212, symptoms of problem 214, component affected (COMPID) 216, users affected 218, user notes 220, assessment index 222, and evaluated action options 224. The status associated with the system resolving the SYSMOD 208 can provide status of the PTF itself, for instance, the PTF name, status indicating whether the PTF is considered good/functional, and whether the PTF has been received by the particular system running the MAT 128. Since problems can be logged in the problem database 138 of FIG. 1 before maintenance updates 142 are created, the PTF availability date 210 can be used to determine when a planned PTF will be available and in aging calculations for released PTFs. The classification of problem 212 indicates the level of impact of a problem and whether the problem is attributable to an application or to a maintenance update, e.g., a HIPER. The symptoms of problem 214 may indicate the hierarchical level that the problem appears at, e.g., a particular function or pervasive. The COMPID 216 may identify a particular low-level software component that is affected by the problem. The users affected 218 can identify particular users, systems, or group of users that are affected by the problem identified by the APAR number 206. The user notes 220 provides an interactive field for entering reasons as to why a particular PTF should be accepted, rejected, or delayed in installation. The assessment index 222 can output a numerical score based on weight of factors indicating the criticality of installing the PTF, which can serve as an installation recommendation. Alternatively, the assessment index 222 can be mapped to various recommendation messages indicating to the user whether the PTF should be installed and may optionally include reasons why the PTF should be installed.

Evaluated action 224 provides a list of available actions for the user to take. For example, a user may decide to install the PTF, install the PTF and remove the record for the APAR number 206 from the current display list of the interactive interface 200, keep or retain the record to the APAR number 206 in the current display list, or remove the record for the APAR number 206 from the current display list. Selecting to install the PTF results in a request to copy or download the selected PTF from the maintenance updates 142 and write it to the installed maintenance updates 146, 156, or 158 depending upon the system affected. If a user decides to keep the record but not install the PTF yet, the reasons for this can be logged in the user notes 220, which are then written to the decision log 144 or 154.

Figure 3:
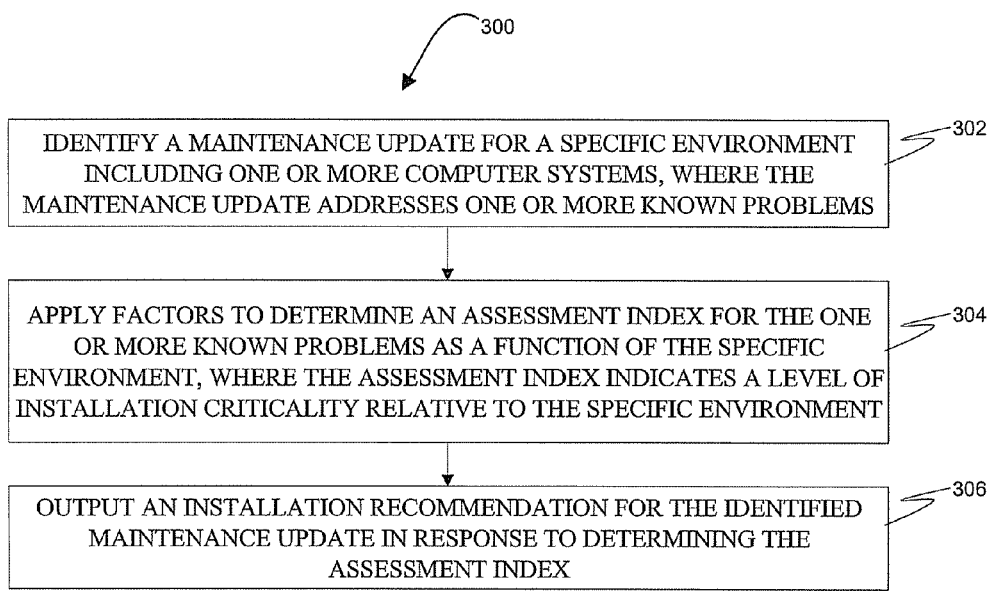
FIG. 3 depicts an exemplary process for maintenance assessment management in accordance with exemplary embodiments.

Turning now to FIG. 3, a process 300 for maintenance assessment management will now be described in accordance with exemplary embodiments, and in reference to FIGS. 1 and 2. A user can initiate the MAT 128 of enterprise 104 or 108 to assess environment specific maintenance actions for the respective enterprise. The MAT 128 communicates with the provider system 102 to assess known problems in the problem database 138 and determine which problems have been flagged as critical via the critical update identifiers 140. The MAT 128 can analyze each of the known problems to determine whether an update is available to remedy the problem and assist the user in deciding if the update should be installed based on a maintenance assessment index. At block 302, the MAT 128 identifies a maintenance update (e.g., a PTF) in the maintenance updates 142 to address one or more known problems that are applicable for the specific environment of the enterprise of the MAT 128, which includes one or more computer systems.

At block 304, the MAT 128 applies factors to determine an assessment index for the one or more known problems as a function of the specific environment, where the assessment index indicates a level of installation criticality relative to the specific environment of the enterprise. The factors may include a level of importance as a function of one or more defect attributes associated with the one or more known problems, a level of exposure to the one or more known problems in the specific environment, and policies of the specific environment. The one or more defect attributes can include a classification and symptoms of the one or more known problems. The level of exposure may be determined by comparing problem triggers to the specific environment and further determined by pervasiveness of the one or more known problems. The policies can include an acceptable age of the maintenance update and specific components or functions with a higher degree of sensitivity. The profile data 134 or 152 may establish weighting values for each of the factors, allowing the MAT 128 to apply the weighting values to each of the factors to determine the assessment index.

At block 306, the MAT 128 outputs an installation recommendation for the identified maintenance update in response to determining the assessment index. The output may be displayed via a user interface (e.g., user interface 116 or 118) and can be formatted as depicted in FIG. 2. In an exemplary embodiment, the output is interactive to enable the user to select a recommended action and log notes as to why the selected action was taken. The MAT 128 can also store user decisions regarding installation of the maintenance update in the decision log 144 or 154.

Technical effects of exemplary embodiments include using a maintenance assessment tool to create and track an assessment index for maintenance updates based upon an enterprise specific configuration and other known factors. Additional technical effects include tracking evaluations and decisions regarding installation of maintenance updates to fix known problems. The assessment index enables users to determine the criticality of installing updates with respect to the present environment and/or the planned future environment.

The capabilities of the present invention can be implemented in software, firmware, hardware or some combination thereof.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A computer-implemented method for assessing environment specific maintenance actions, comprising:
    identifying a maintenance update for a specific environment including one or more computer systems, wherein the maintenance update addresses a known problem;
    applying factors to determine an assessment index for the known problem as a function of the specific environment, wherein the assessment index indicates a level of installation criticality relative to the specific environment;
    outputting an installation recommendation for the identified maintenance update in response to determining the assessment index;
    establishing a weighting value for each of the factors;
    applying the weighting value to each of the factors to determine the assessment index;
    storing user decisions regarding installation of the maintenance update; and
    wherein the factors include a level of importance as a function of one or more defect attributes associated with the known problem, a level of exposure to the known problem in the specific environment, and policies of the specific environment;
    wherein the polices include an acceptable age of the maintenance update and specific components.

2. The method of claim 1 wherein the one or more defect attributes include a classification and a symptom of the known problem.

3. The method of claim 1 wherein the level of exposure is determined by comparing problem triggers to the specific environment and further determined by pervasiveness of the known problem.

4. A computer system including center processing unit for maintenance assessment management, comprising:
    a service inventory identifying a specific environment of the system; and
    a maintenance assessment tool (MAT) executing on a user system that includes a storage medium readable by a processing circuit and storing instructions for execution by the processing circuit for implementing a method performed by the MAT, the method comprising:
    identifying a maintenance update for the specific environment, wherein the maintenance update addresses a known problem;

applying factors to determine an assessment index for the known problem as a function of the specific environment, wherein the assessment index indicates a level of installation criticality relative to the specific environment;

outputting an installation recommendation for the identified maintenance update in response to determining the assessment index;

establishing a weighting value for each of the factors;

applying the weighting value to each of the factors to determine the assessment index;

storing user decisions regarding installation of the maintenance update; and wherein the factors include a level of importance as a function of one or more defect attributes associated with the known problem, a level of exposure to the known problem in the specific environment, and policies of the specific environment;

wherein the polices include an acceptable age of the maintenance update and specific components.

5. The system of claim 4 wherein the one or more defect attributes include a classification and a symptom of the known problem.

6. The system of claim 4 wherein the level of exposure is determined by comparing problem triggers to the specific environment and further determined by pervasiveness of the known problem.

7. A computer program product for assessing environment specific maintenance actions, the computer program product comprising:

a storage medium readable by a processing circuit and storing instructions for execution by the processing circuit for implementing a method, the method comprising:

identifying a maintenance update for a specific environment including one or more computer systems, wherein the maintenance update addresses a known problem;

applying factors to determine an assessment index for the known problem as a function of the specific environment, wherein the assessment index indicates a level of installation criticality relative to the specific environment;

outputting an installation recommendation for the identified maintenance update in response to determining the assessment index;

establishing a weighting value for each of the factors;

applying the weighting value to each of the factors to determine the assessment index; and storing user decisions regarding installation of the maintenance update; and wherein the factors include a level of importance as a function of one or more defect attributes associated with the known problem, a level of exposure to the known problem in the specific environment, and policies of the specific environment;

wherein the polices include an acceptable age of the maintenance update and specific components.

8. The computer program product of claim 7 wherein the one or more defect attributes include a classification and a symptom of the known problem.

9. The computer program product of claim 7 wherein the level of exposure is determined by comparing problem triggers to the specific environment and further determined by pervasiveness of the known problem.

\* \* \* \* \*